United States Patent [19]
Fukuyo

[11] 3,711,962
[45] Jan. 23, 1973

[54] FLUIDIZED DRYING APPARATUS
[75] Inventor: Masaichi Fukuyo, Shizuoka-ken, Japan
[73] Assignee: Kabushiki Kaisha Okawara Seisakusho, Harbara-gun, Shizuoka-ken, Japan
[22] Filed: Dec. 15, 1970
[21] Appl. No.: 98,397

[52] U.S. Cl. ................................34/57 D
[51] Int. Cl. ..............................F26b 17/10
[58] Field of Search .....34/10, 57 A, 57 D; 263/21 A; 259/DIG. 17, 108, 8

[56] References Cited

UNITED STATES PATENTS

| | | | |
|---|---|---|---|
| 2,641,453 | 6/1953 | Teale | 259/8 |
| 3,411,465 | 11/1968 | Shirai | 110/8 R |
| 3,119,605 | 1/1964 | Berz | 34/57 D |
| 3,298,792 | 1/1967 | DiDrusco | 34/57 A |
| 3,511,843 | 5/1970 | Lewis | 34/10 |

FOREIGN PATENTS OR APPLICATIONS 1,010,460  6/1957  Germany..................34/57 D Primary Examiner—William F. O'Dea
Assistant Examiner—William C. Anderson
Attorney—Ernest A. Greenside

[57] ABSTRACT

A fluidized drying apparatus having a substantially cylindrical casing, a perforated plate provided in said casing which divides the interior of said casing into an upper solid fluidizing chamber and a lower windbox chamber and which has formed therein a number of perforations each being inclined with respect to the axis of said casing so as to direct a drying gas passing therethrough in a direction at an acute angle to the surface of said perforated plate and means for feeding a granular material to be dried into said fluidizing chamber. A breaking member is provided in the casing above the perforated plate, which is rotated during operation of the apparatus to break lumps of material agglomerating on said perforated plate.

2 Claims, 2 Drawing Figures

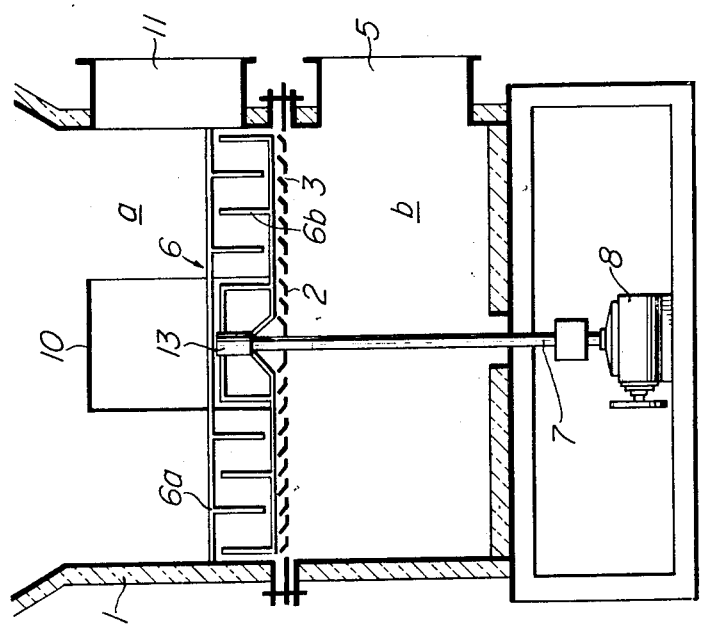
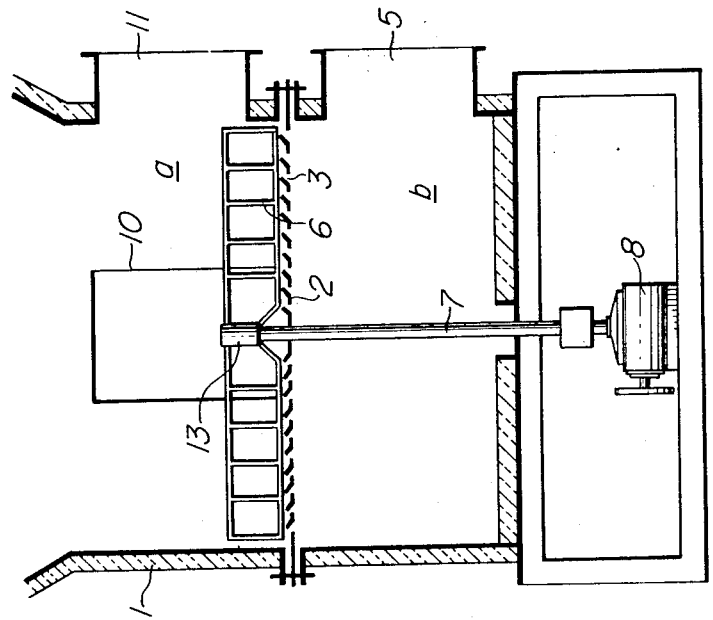

FLUIDIZED DRYING APPARATUS

The present invention relates to a fluidized drying apparatus and more specifically to such a fluidized drying apparatus which is provided therein with a member for breaking lumps of granular or powdered feed material cohering on a perforated plate in a fluidizing chamber.

A conventional fluidized drying apparatus of the type wherein a granular material to be dried is fed into a fluidizing chamber and dried by a drying gas swirling within said chamber, had the drawback that, where the feed material is cohesive, the material agglomerates on a perforated plate in a fluidizing chamber and the so-called "channeling" phenomenon occurs in which a drying gas passes only through gas passageways formed at portions of the fluidized bed of material, with the result that uniform drying of the material cannot be attained.

The object of the present invention is to provide a fluidized drying apparatus in which a member capable of breaking lumps of feed material cohering onto a perforated plate in a fluidizing chamber (hereinafter referred to as a breaking member) is provided, whereby the lumps are broken into grains or smaller parts and kept fluidized and, therefore, the feed material is dried in an efficient manner.

According to the present invention there is provided a fluidized drying apparatus of the type having a generally cylindrical casing, a perforated plate provided in said casing which divides said casing into an upper solid fluidizing chamber and a lower windbox chamber, each of the perforations in said plate being inclined to the axis of said casing so as to direct a gas passing therethrough in operation in a direction at an acute angle to the surface of the plate, and means for feeding a powdered or granular material to be dried into said upper chamber, which apparatus comprises a breaking member for breaking the powdered or granular material cohering on said perforated plate.

The present invention will be described in detail hereinafter with reference to the accompanying drawings, in which:

FIG. 1 is a vertical cross-sectional front view showing diagrammatically an embodiment of the fluidized drying apparatus according to the present invention, with a breaking member provided therein; and FIG. 2 is a vertical cross-sectional front view showing diagrammatically another embodiment of the fluidized drying apparatus of the invention, with another form of the breaking member provided therein.

Referring first to FIG. 1 there is shown the first embodiment of the fluidized drying apparatus according to the present invention. The apparatus includes a generally cylindrical casing 1 and a perforated plate 2 made of a material free of thermal deformation provided in said casing 1, by which the interior of said casing 1 is divided into an upper solid fluidizing chamber $a$ and a lower windbox chamber $b$. Each of the perforations 3 formed in the perforated plate 2 is inclined at an angle to the axis of the cylindrical casing 1 so as to direct a drying gas passing therethrough in operation in a direction at an acute angle to the surface of said plate 2.

The casing 1 is provided with a gas inlet port 5 for supplying a drying gas into the windbox chamber $b$ therethrough. Above the perforated plate 2 is provided a breaking member 6 which comprises two upper and lower rod-shaped arms extending diametrically of the casing (1) and connected with each other at several locations by connecting rods into the shape of a window frame and a boss 13 provided at the center thereof. The breaking member 6 is connected to a drive shaft 7 through the boss 13 thereof, which drive shaft is driven by a driving mechanism 8. Reference numeral 10 designates a material outlet port for discharging the dried material from the fluidizing chamber $a$ therethrough, and 11 designates a manhole communicating with the fluidizing chamber $a$, through which said fluidizing chamber is cleaned and inspected.

For drying a granular material, which is relatively hard to cohere or is relatively high in fluidity, in the fluidized drying apparatus shown in FIG. 1, a drying gas is supplied into the windbox chamber $b$ through the gas inlet port 5 and ejected into the fluidizing chamber $a$ through the perforated plate 3 in directions at an angle to the surface of said perforated plate, whereby said drying gas ascends in the fluidizing chamber $a$ while swirling about the axis thereof throughout the cylindrical space thereof. Therefore, when a granular material to be dried is thrown into the swirling gas flow from the upper side as at 3', it flows within the fluidizing chamber $a$ about the axis thereof while being entrained in the ascending swirling gas flow and is uniformly stirred, whereby the material is dried uniformly in a short period of time, even when the grain size of the material largely varies. Upon completion of the drying, the dried material is automatically discharged through the material outlet port 10 into a container (not shown) exterior of the apparatus, under the force of the swirling gas, when said material outlet port is opened. However, where the material is cohesive, only the ascending swirling flow of the drying gas formed in the fluidizing chamber $a$ is not sufficient to prevent the material from agglomerating on the perforated plate 2 and the so-called "channeling" phenomenon occurs in which the drying gas passes only through passageways formed at portions of the material bed and does not pass through the other portions of said material bed. In such a case, therefore, the breaking member 6 is driven by the driving mechanism 8 while the ascending swirling flow of the drying gas is being formed within the fluidizing chamber $a$ by the perforated plate 2, whereby the material agglomerating on said perforated plate 2 is constantly broken into grains or smaller parts and kept fluidized by said breaking member 6 and is dried efficiently by the drying gas passing therethrough. Thus, even a cohesive material can be broken up and kept fluidized and dried uniformly.

The second embodiment of the fluidized drying apparatus of the invention is shown in FIG. 2. This embodiment is identical with the first embodiment shown in FIG. 1, except for the breaking member, and the same parts are indicated by same numerals. In FIG. 2, the breaking member 6 consists of a first member 6a and a second member 6b, both of which are provided above the perforated plate 2. The first member 6a has the shape of a rake and extends diametrically across the casing 1, with the opposite ends thereof fixed to said casing. The second member 6b also has the shape of a rake and extends diametrically across the casing 1, with the central portion thereof secured to a drive shaft 7 through a boss 13, which drive shaft 7 is connected to a driving mechanism 8 to be driven thereby. The first member 6a and the second member 6b are arranged in parallel relation to each other, with the projecting prongs of the former located in the interspaces of the projecting prongs of the latter.

In the operation of the fluidized drying apparatus of FIG. 2, when the member 6b is rotated, the agglomerating material is not only broken up by the rotating member 6b but also more forcibly broken into smaller parts or grains by a shearing force produced by the coaction of the members 6a and 6b, so that even a more cohesive feed material which could not possibly be handled by the breaking member shown in FIG. 1 can be broken up, kept fluidized, and the material is dried uniformly in a short period of time by uniform contact with the drying gas.

What is claimed is

1. A fluidized drying apparatus of the type having a generally cylindrical casing, a single annular integral plate provided in said casing and extending transversely across the entire extent of the casing for dividing said casing into an upper solid fluidizing chamber adapted to receive finely divided material to be dried and a lower windbox chamber into which a drying gas is adapted to be introduced, said integral plate being formed with a plurality of closely spaced perforations extending radially from the center of said plate to the outer periphery thereof, with each perforation providing unimpeded communication between the upper fluidizing chamber and the lower windbox chamber and being inclined to the axis of the casing at an angle to direct said gas passing therethrough, during operation, in a direction at an acute angle to the surface of the plate, and a rotatable breaker member extending diametrically substantially across the entire extent of the annular plate, said breaker member comprising first and second spaced apart members disposed above said single perforated plate with at least one of said members mounted for rotation about the longitudinal axis of said casing, and drive means adapted to drive said one of said breaker members from a side of of said perforated annular plate opposite the side on which said first and second breaker members are located, and outlet means communicating with the upper chamber for discharging dried material.

2. Apparatus according to claim 1, wherein said one of said members has the shape of a rake and extends substantially diametrically across the casing with a central portion thereof driven by a drive shaft in turn connected to said drive means, the other of said breaker members also having the shape of a rake and extending substantially diametrically across said casing with the opposite ends thereof fixed to the casing, said first and second members being arranged in parallel relation to each other with the projecting prongs of the former projecting into the interspaces of projecting prongs of the latter.

* * * * *